United States Patent [19]

Flossdorf et al.

[11] 4,090,795

[45] May 23, 1978

[54] DOUBLE SECTOR CELL FOR AN ULTRA-CENTRIFUGE

[75] Inventors: Josef Flossdorf; Henning Schillig, both of Braunschweig, Germany

[73] Assignee: Gesellschaft fuer Biotechnologische Forschung mit beschraenkter Haftung (GBF), Germany

[21] Appl. No.: 773,396

[22] Filed: Mar. 2, 1977

[30] Foreign Application Priority Data

Feb. 14, 1977 Germany ............................ 2706170

[51] Int. Cl.[2] ............................................ G01N 1/10

[52] U.S. Cl. ....................................... 356/246; 233/26

[58] Field of Search ..................... 233/1 R, 26, 27, 28; 356/246, 197

[56] References Cited

U.S. PATENT DOCUMENTS

| | | | |
|---|---|---|---|
| 3,391,597 | 7/1968 | Gropper | 233/26 X |
| 3,586,484 | 6/1971 | Anderson | 233/1 R |
| 3,771,878 | 11/1973 | Molloy et al. | 233/26 X |
| 3,778,171 | 12/1973 | Chervenka | 356/246 |

FOREIGN PATENT DOCUMENTS

| | | | |
|---|---|---|---|
| 660,156 | 5/1938 | Germany | 233/1 R |

*Primary Examiner*—George H. Krizmanich
*Attorney, Agent, or Firm*—Brumbaugh, Graves, Donohue & Raymond

[57] ABSTRACT

The specification describes a double sector cell for ultra-centrifuges. It comprises a tubular housing comprising a lower window holder with a lower window, a cell arrangement and an upper window holder with an upper window. There are radial filling openings, which allow access to one respective cell of the cell arrangement and are closed by sealing plugs. The cell arrangement comprises two sector cell center pieces forming respected pairs of cell chambers. Between the chambers a center window is arranged in a centering ring. The housing has two pairs of filling openings, which when the cell is assembled are flush with the associated filling holes of the center pieces.

2 Claims, 3 Drawing Figures

DOUBLE SECTOR CELL FOR AN ULTRA-CENTRIFUGE

BACKGROUND OF THE INVENTION

1. Field to which the invention relates

The present invention relates to a double sector cell for an ultra-centrifuge comprising a tubular housing which comprises, in the following order as stated, a lower window holder, in which a lower window is located, a cell arrangement and an upper window holder, in which an upper window is located, and has radial filling openings, which allow access to one respective cell of the cell arrangement and are adapted to be closed by respective sealing plugs.

The present invention is particularly useful in an analytical centrifuge of the type described in U.S. Pat. No. 3,518,012 wherein reagents are placed within a centrifuge cell and optically analyzed while undergoing centrifugal forces. The cell of the present invention is adapted for direct replacement of conventional analytical cells used in centrifugal devices of this type.

2. The prior art

The periodical "Biophysical Chemistry" 3 (1975), pages 153 to 160, describes a method for determining equilibrium constants from measurements of the sedimentation diffusion equilibrium data using an ultra-centrifuge, in the case of which a reacting mixture is compared with a non-reacting mixture of the same composition on the basis of its optical absorption or of interferrometry. For carrying out such investigations the conventional center piece of the centrifuge double sector cell is replaced by two contacting center pieces.

In accordance with the analytical technique described in the referenced article, tandem double-sector specimen cell chambers are arranged so that light used for specimen analysis is caused to simultaneously pass through upper and lower specimen chambers. Thus, in order to carry out the analytical technique of the article it is necessary to use an analytical cell for the ultra centrifuge which includes upper and lower specimen cell pairs, so that light may be passed through the upper and lower cells simultaneously and may be sequentially passed through adjacent pairs of upper and lower cells. Thus, the analytical technique requires the use of tandem double-sector analytical cells.

SHORT SUMMARY OF THE INVENTION

One aim of the present invention is to create such a "tandem" double sector cell, which is distinguished by a particularly convenient design.

In accordance with the present invention the cell arrangement comprises two sector cell center pieces, which respectively form a pair of cell chambers and a center window, arranged between the cell chambers and located in a centering ring. The housing comprises two pairs of filling openings, which in the assembled condition of the cell are aligned with associated filling holes in the center pieces.

The tandem double sector cell in accordance with the invention can be used in a centrifuge in lieu of a conventional double sector cell. It is low in cost because it consists substantially of commercially available parts or can be manufactured from them.

In what follows an embodiment of a tandem double sector cell in accordance with the invention will be described in detail with reference to the accompanying drawings.

DESCRIPTION OF PREFERRED EMBODIMENTS

Figure 1:
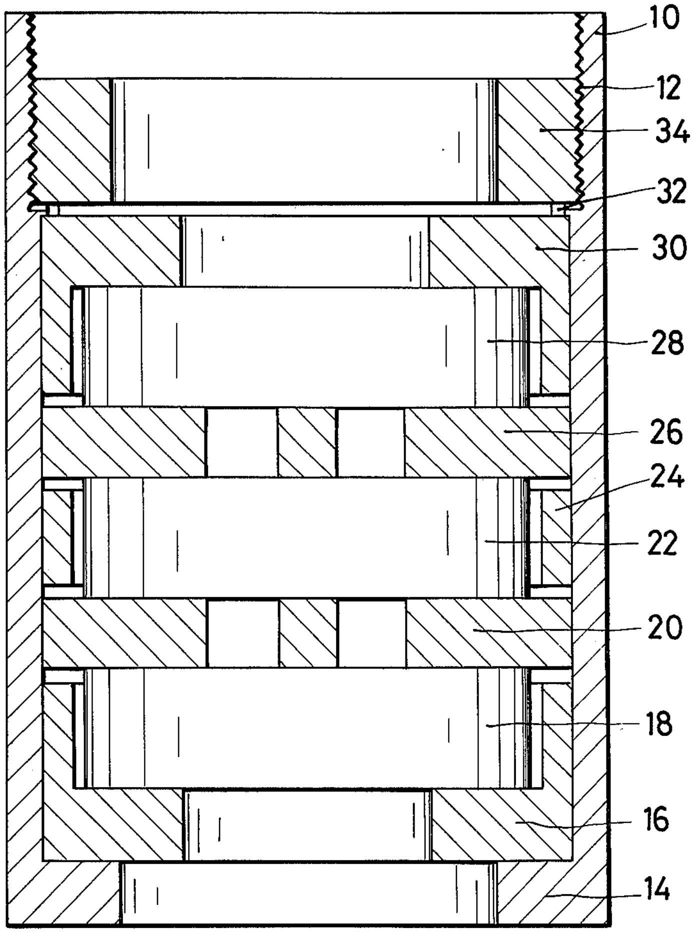
FIG. 1 shows an axial section through a tandem double sector cell in accordance with one embodiment of the invention.

The tandem double sector cell represented as an embodiment of the invention, is intended for a commercially available analytical Beckman ultra-centrifuge. The cell comprises a tubular housing 10, which at the upper end has an internal screw thread 12 and at the lower end has an inwardly projecting annular abutment flange 14. In the housing the following parts, stated in an ascending order, are arranged: A lower window holder 16, a lower window 18, a first center piece 20, a center window 22, which is centered by a centering ring 24, a second center piece 26, an upper window 28, an upper window holder 30, a washer 32 and a holding ring 34, screwed into the internal screw thread 12 and which holds and presses together the above mentioned parts in the housing and is screwed into the internal screw thread 12.

Figure 2:
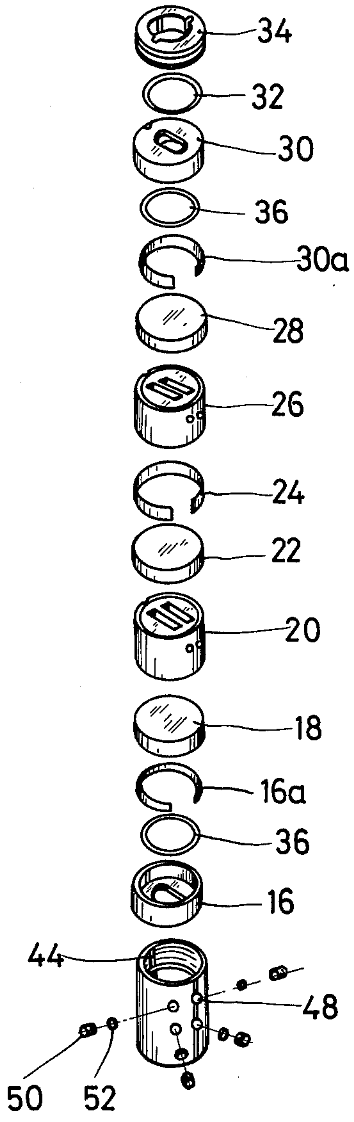
FIG. 2 shows an exploded view of the parts of the tandem double sector cell in accordance with FIG. 1.

As FIG. 2 shows, it is conventional to use plastics liners **16*a* and 30*a* respectively to center the windows 18 and 28 in their respective window holders 16 and 30. The center window 22 fits snugly into its centering ring 24. The parts 16*a*, 30*a* and 36 are not shown in FIG. 1. Between the windows 18, 22 and 28 and the center pieces 20 and 26** sealing rings may also be provided which are not shown.

Figure 3:
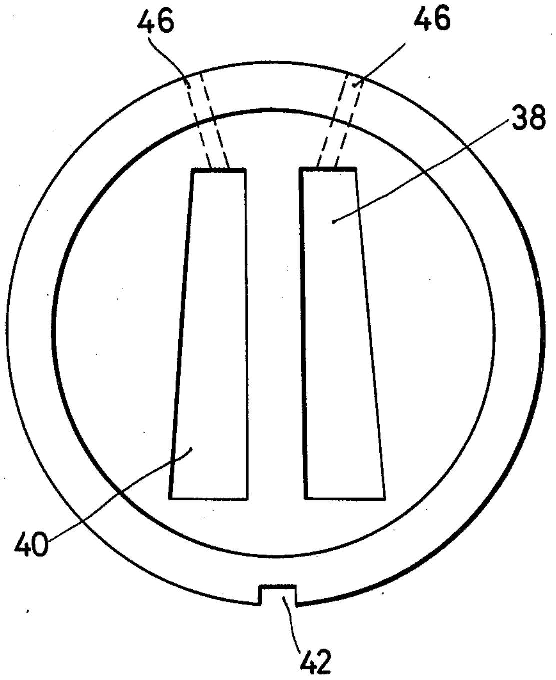
FIG. 3 shows a plan view of the center piece of the double sector cell in accordance with FIGS. 1 and 2.

The center pieces 20 and 26 respectively comprise two sector-shaped openings 38 and 40 (FIG. 3) which form the cell chambers. The center pieces are furthermore provided with an orientating groove 42, which cooperates with a corresponding rib 44 in the housing and ensures the correct angular orientation of the cells with respect to the rotor of the ultra-centrifuge.

A respective hole 46 extends from the ends, adjacent to the rotor axis in operation, of the openings 38 and 40 forming the cells, to the peripheral wall of the center piece. When the cell is assembled, the openings of the holes 46 are aligned with corresponding openings 48, which are provided in the wall of the housing 10 and can be respectively sealed by a screw plug 50 with a gasket 52.

The thickness of the specimen cell assembly formed by the center pieces 20, 26 and the center window 22 is so dimensioned that this arrangement has substantially the same height as a normal cell center piece, which in the case of the above mentioned ultra-centrifuge has a thickness of approximately 12 mm or 30 mm, respectively. For the tandem double sector cell in the present case a thickness of approximately 3 mm for the center pieces 20 and 26 and a thickness of 5 mm for the window 22 has been found satisfactory.

The analytical cell of the present invention makes use of tandem double-sector cell centerpieces to facilitate analytical experiments which require simultaneous passing of light through multiple specimen chambers. The arrangement facilitates filling of the chambes by use of the filling openings provided in the housing and the centerpieces. The chambers are filled by the use of syringes and can be emptied in the same manner. An important consideration is that the overall arrangement and balancing of the centrifuge cell is similar to the arrangement of conventional cells, so that the tandem double-sector cell can be used in a centrifugal rotor without modification or substantial rebalancing of the rotor.

What we claim is:

1. A tandem, double-sector analytical cell for an ultra-centrifuge comprising a tubular housing, a lower window maintained in said housing by a lower window holder, an upper window maintained in said housing by an upper window holder and a specimen cell assembly maintained between said upper and lower windows, said assembly including a center window, a centering ring surrounding said center window, and first and second sector cell centerpieces located on opposite sides of said center window, each having a pair of sector cell chambers and filling holes connected to said chambers, said housing including radial filling opening aligned with said filling holes and adapted to be closed by sealing plugs, said sector cell chambers being arranged for series transmission of light through respective chambers in said first and second centerpieces.

2. An analytical cell as specified in claim 1 wherein said upper, lower and center windows have equal thickness.

* * * * *